(12) United States Patent
Jebai et al.

(10) Patent No.: US 10,432,121 B2
(45) Date of Patent: Oct. 1, 2019

(54) METHOD FOR IDENTIFYING MAGNETIC SATURATION PARAMETERS OF AN ASYNCHRONOUS ELECTRIC MOTOR

(71) Applicant: Schneider Toshiba Inverter Europe SAS, Pacy sur Eure (FR)

(72) Inventors: Al Kassem Jebai, Vernon (FR); Francois Malrait, Jouy sur Eure (FR); Thomas Devos, Carrieres sous Poissy (FR); Alain Dutrey, Saint Germain en Laye (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 0 days.

(21) Appl. No.: 16/051,597

(22) Filed: Aug. 1, 2018

(65) Prior Publication Data
US 2019/0074787 A1 Mar. 7, 2019

(30) Foreign Application Priority Data
Sep. 1, 2017 (FR) ..................... 17 70913

(51) Int. Cl.
*H02P 1/24* (2006.01)
*H02P 1/42* (2006.01)
(Continued)

(52) U.S. Cl.
CPC ............ *H02P 21/141* (2013.01); *H02P 21/14* (2013.01); *H02P 21/18* (2016.02); *H02P 21/20* (2016.02);
(Continued)

(58) Field of Classification Search
CPC .............................. H02P 21/141; H02P 21/18
(Continued)

(56) References Cited

U.S. PATENT DOCUMENTS 9,197,152 B2 11/2015 Jebai et al.
9,948,224 B1 * 4/2018 Huh ........................ H02P 21/24
(Continued)

FOREIGN PATENT DOCUMENTS

JP 2010-68627 3/2010
WO WO 2012/123255 A2 9/2012

OTHER PUBLICATIONS

French Preliminary Search Report dated Mar. 27, 2018 in French Application 17 70913 filed on Sep. 1, 2017 (with English Translation of Categories of cited documents & Written Opinion).

(Continued)

*Primary Examiner* — Erick D Glass
(74) *Attorney, Agent, or Firm* — Oblon, McClelland, Maier & Neustadt, L.L.P.

(57) ABSTRACT

A method identifies magnetic saturation parameters of an asynchronous electric motor. The method consists in a monitoring and identification sequence including one or several iterations. The method includes applying at the input of the control law of a reference voltage or a reference flux trajectory or a reference range in order to obtain a magnetization current, building a real profile of magnetic saturation including estimate magnetization flux and measures magnetization current, and determining magnetic saturation parameters corresponding to the real profile already obtained.

13 Claims, 7 Drawing Sheets

(51) Int. Cl.
  *H02P 3/18*   (2006.01)
  *H02P 21/14*  (2016.01)
  *H02P 21/18*  (2016.01)
  *H02P 21/20*  (2016.01)
  *H02P 21/22*  (2016.01)
  *H02P 23/14*  (2006.01)

(52) U.S. Cl.
  CPC .............. *H02P 21/22* (2016.02); *H02P 23/14* (2013.01); *H02P 2207/01* (2013.01)

(58) Field of Classification Search
  USPC ........................................................ 318/727
  See application file for complete search history.

(56) References Cited

U.S. PATENT DOCUMENTS

| | | | | |
|---|---|---|---|---|
| 2003/0006723 A1* | 1/2003 | Sul | .......................... | H02P 21/24 318/127 |
| 2006/0091847 A1* | 5/2006 | Piippo | ................... | H02P 21/141 318/721 |
| 2013/0265013 A1* | 10/2013 | Cao | ......................... | H02P 21/12 322/99 |
| 2013/0334992 A1 | 12/2013 | Jebai et al. | | |

OTHER PUBLICATIONS

Ranta, M. et al. "Online Identification of Parameters Defining the Saturation Characteristics of Induction Machines", Electrical Machines (ICEM), IEEE, 2012, 7 pages.

\* cited by examiner

METHOD FOR IDENTIFYING MAGNETIC SATURATION PARAMETERS OF AN ASYNCHRONOUS ELECTRIC MOTOR

TECHNICAL FIELD OF THE INVENTION

The present invention relates to a method of identifying the magnetic saturation parameters of an asynchronous type electric motor. The invention also concerns a system of identifying the magnetic saturation parameters of an asynchronous type electric motor.

PRIOR ART

For optimizing the static and dynamic performances of an electric motor, it is important to know the magnetic saturation characteristic of the magnetization flux of the motor.

Indeed, knowledge of such a characteristic makes it possible:

To improve the stability and performance of the electric motor running at very high speed;
To improve the maximum torque supplied by the electric motor;
To reduce the current consumption by the electric motor;
To increase the energy efficiency of the electric motor.

This magnetic saturation characteristic is expressed by a magnetic saturation curve of the electric motor, represented by the relationship between the magnetization flux (also called magnetizing flux) and the magnetization current. In order to know the magnetic saturation characteristic, it is therefore necessary to determine this curve, to model it and to identify the magnetic saturation parameters that make it possible to best approximate it.

There are solutions for identifying the magnetic saturation parameters of a synchronous type permanent magnet electric motor. Such a solution is described in the patent application WO2012/123255A2. However, this is not suitable for determining the magnetic saturation parameters of an asynchronous type electric motor.

The document JP2010-068627 also describes a solution for determining the magnetic saturation parameters of an asynchronous motor.

The object of the invention is therefore to provide a method of identifying the magnetic saturation parameters that is suitable for an asynchronous type (induction) electric motor.

The method of the invention may be implemented while the electric motor is running, under no-load or under load.

DISCLOSURE OF THE INVENTION

This object is achieved by a method of identifying the magnetic saturation parameters of an asynchronous electric motor, said method consisting in implementing a sequence comprising one or more iterations, each iteration being defined with a rank i, with i ranging from 1 to n, each iteration of rank i when i is greater than or equal to 2 comprising the following steps:

a) Applying a trajectory to a reference voltage or to a reference flux, over a reference range having a voltage or flux amplitude between a minimum value and a maximum value,
b) Acquiring the values of the currents in the phases of the electric motor and determining the corresponding magnetization current,
c) Estimating the magnetization flux,
d) Constructing an actual profile for the iteration of rank i comprising said estimated magnetization flux according to the measured magnetization current,
e) Determining the magnetic saturation parameters corresponding to the actual profile of the iteration of rank i,
f) Determining a deviation between said actual profile for the iteration of rank i and a theoretical profile constructed from the magnetic saturation parameters obtained during the iteration of rank i−1,
g) Validating the magnetic saturation parameters obtained during the iteration of rank i when said deviation is less than a threshold and when the reference range applied at the input has a sufficient amplitude.

According to a particular aspect of the invention, when said deviation is greater than said threshold, it consists in implementing the following step:

Comparing said deviation of the iteration of rank i in relation to the deviation obtained during the iteration of rank i−1,
  i. If said deviation of the iteration of rank i is less than the deviation obtained for the iteration of rank i−1, storing the magnetic saturation parameters obtained for the iteration of rank i and implementing the iteration of rank i+1 with a new reference range,
  ii. If said deviation of the iteration of rank i is greater than the deviation obtained for the iteration of rank i−1, storing the magnetic saturation parameters obtained during the iteration of rank i−2 and implementing the iteration of rank i+1 with a new reference range.

According to a particular aspect of the invention, the method comprises, after step f), a step of verifying the reference range used in relation to a threshold range.

According to a particular aspect of the invention, the method comprises, after the step of verifying, a step of updating the magnetic saturation parameters with the magnetic saturation parameters calculated during the iteration of rank i when the applied reference range is less than said threshold range.

According to a particular aspect of the invention, the method comprises a step of modifying said reference range after said step of updating the magnetic saturation parameters and implementing the iteration of rank i+1 with a new reference range.

According to a particular aspect of the invention, for the iteration of rank i=1, the magnetic saturation parameters are determined so that the estimated magnetization flux is substantially equal to the nominal flux.

The invention also concerns a system of identifying the magnetic saturation parameters of an asynchronous electric motor, said system being set up for implementing a sequence comprising one or more iterations, each iteration being defined with a rank i, with i ranging from 1 to n, and for each iteration of rank i when i is greater than or equal to 2, the system comprises:

a) A module for applying a reference voltage or reference flux trajectory, over a reference range,
b) A module for acquiring the currents in the phases of the electric motor and determining the corresponding magnetization current,
c) A module for estimating the magnetization flux,
d) A module for constructing an actual profile for the iteration of rank i comprising said estimated magnetization flux according to the measured magnetization current, e) A module for determining the magnetic saturation parameters corresponding to the actual profile of the iteration of rank i, f) A module for determining a deviation between said actual profile for the iteration of rank i and a theoretical profile constructed from the magnetic saturation parameters obtained during the iteration of rank i−1, g) A module for validating the magnetic saturation parameters obtained during the iteration of rank i when said deviation is less than a threshold and when the reference range applied at the input has a sufficient amplitude.

According to a particular aspect of the system, when said deviation is greater than said threshold, said system is set up for executing a module for comparing said deviation of the iteration of rank i in relation to the deviation obtained during the iteration of rank i−1, and:

i. If said deviation of the iteration of rank i is less than the deviation obtained for the iteration of rank i−1, said system is set up for executing a module for storing the magnetic saturation parameters obtained for the iteration of rank i and implementing the iteration of rank i+1 with a new reference range, ii. If said deviation of the iteration of rank i is greater than the deviation obtained for the iteration of rank i−1, said system is set up for executing a module for storing the magnetic saturation parameters obtained during the iteration of rank i−2 and implementing the phase of rank i+1 with a new reference range.

According to another aspect of the invention, the system comprises a module for verifying the reference range used in relation to a threshold range, executed when said deviation is less than a threshold.

According to another aspect of the invention, the system comprises a module for updating the magnetic saturation parameters with the magnetic saturation parameters calculated during the iteration of rank i when the applied reference range is less than said threshold range.

According to another aspect of the invention, the system comprises a module for modifying said reference range after said step of updating the magnetic saturation parameters and implementing the iteration of rank i+1 with a new reference range.

According to another aspect of the invention, for the iteration of rank i=1, the magnetic saturation parameters are determined so that the estimated magnetization flux is substantially equal to the nominal flux.

The invention also concerns a variable speed drive that comprises a system of identifying as defined above.

BRIEF DESCRIPTION OF THE FIGURES

Other features and advantages will appear in the following detailed description, made in connection with the appended figures listed below.

DETAILED DESCRIPTION OF AT LEAST ONE EMBODIMENT

Figure 1:
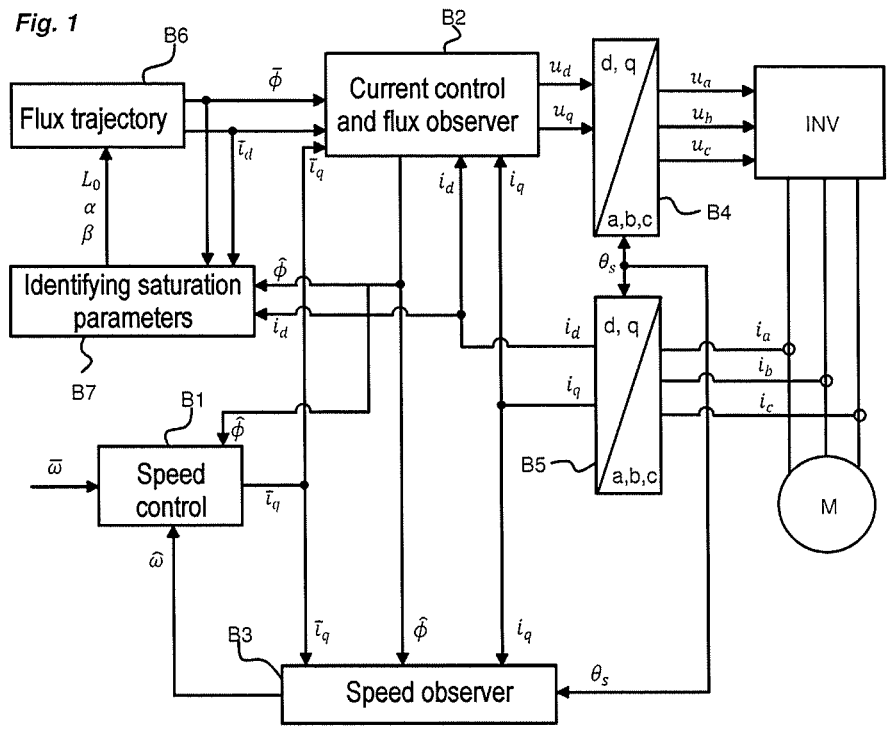
FIG. 1 illustrates, in the form of a diagram, the principle of the system of identifying of the invention, implemented within the framework of a sensorless vector flux control of the electric motor.

The invention applies to the control of an asynchronous type electric motor. It concerns the determination of the magnetic saturation characteristic of the motor. This characteristic is defined from multiple magnetic saturation parameters.

In the rest of the description, the expression "magnetic saturation profile" takes the form of a curve connecting the magnetization current and magnetization flux (also called magnetizing flux).

In the rest of the description, the following notations will be used:

$\overline{\omega}$: reference speed.
$\hat{\omega}$: estimated speed.
$\theta_s$: electrical angle.
$\overline{i}_d$: reference current on the d-axis (magnetization current or no-load current).
$\overline{i}_q$: reference current on the q-axis.
$i_d$: current measured on the d-axis (magnetization current or no-load current).
$i_q$: current measured on the q-axis.
$\overline{\phi}$: reference flux.
$\hat{\phi}$: estimated flux.
$\phi_n$: nominal flux.
$L_0$, $\alpha$ and $\beta$: parameters of the magnetic saturation curve (this model is described below).
$u_d$: motor voltage on the d-axis.
$u_q$: motor voltage on the q-axis.
$u_a$, $u_b$ and $u_c$: motor voltages.
$i_a$, $i_b$ and $i_c$: motor currents.

Advantageously the electric motor is a three-phase type.

The method of identifying these magnetic saturation parameters is applicable to an asynchronous type electric motor controlled by an electronic control unit using a vector flux control (without speed sensor) or a scalar type control (U/F).

The method of identifying of the invention works when the electric motor is in normal operation, whether under load or no-load.

The duration of the method of identifying is very short, e.g. of the order of 60 sec approximately, which is totally transparent in some applications (pumping application, for example).

The method may also be implemented in a parameter setting step ("commissioning") before the normal operation of the motor within the framework of its application.

The method may be implemented only once for identifying the magnetic saturation parameters of the electric motor. It may be re-implemented later, e.g. in case of wear of the motor.

A variable speed drive conventionally comprises, but not restrictively:

A rectifier stage connected to an electrical power source for receiving an AC voltage; the rectifier may be of a passive type such as a diode bridge or an active type based on controlled transistors;

A DC power supply bus on which the rectified voltage is applied by the rectifier stage and notably comprising two bus lines and at least one bus capacitor connected between the two lines for stabilizing the bus voltage;

An inverter stage (INV) connected at the output of the DC bus and intended to cut off the DC voltage supplied by the bus at a variable voltage to the electric motor; the inverter stage comprises multiple switching arms each comprising controlled power transistors for applying the variable voltage to the electric motor.

The variable speed drive advantageously incorporates a control unit intended to ensure control of the transistors of the inverter stage. The control unit is based on a control law for determining the voltages to be applied to the electric motor; the control law may notably be of a vector or a scalar type.

The method of identifying is implemented by said control unit.

The system of identifying of the invention advantageously comprises said control unit as well as the software blocks or modules executed by said control unit for implementing the method of identifying of the invention. Suitable software modules will be executed for performing one or more of the steps in the method of identifying.

The system of identifying advantageously comprises measurement means, notably current sensors intended to measure the currents $i_a$, $i_b$, $i_c$ present in the three phases of the motor M. An acquisition module present in the control unit is suitable for collecting all the measurements performed.

With reference to FIG. 1, a vector type control law may comprise the following main features:

A speed control block B1 receiving a speed reference $\overline{\omega}$ at the input, an estimated magnetization flux $\hat{\phi}$ and an estimated speed $\hat{\omega}$, and intended to determine a torque current reference $\overline{i}_q$;

A current control and flux observer block B2 receiving at the input a flux reference $\overline{\phi}$, a flux current reference $\overline{i}_d$ and the torque current reference $\overline{i}_q$ and intended to determine a motor voltage $u_d$ on the d-axis and a motor voltage $u_q$ on the q-axis;

A speed observer block B3 receiving at the input the measured torque current $i_q$, the estimated magnetization flux and the torque current reference $\overline{i}_q$ and intended to determine the estimated speed $\hat{\omega}$ and the electrical orientation angle $\tau_s$;

A first transformation block B4 for applying a change of reference frame, from the d,q reference frame to the a,b,c reference frame. This block receives at the input the motor voltage $u_d$ on the d-axis and the motor voltage $u_q$ on the q-axis and determines, from the angle $\theta_s$, the voltages $u_a$, $u_b$, $u_c$ to be applied on the three phases of the electric motor;

A second transformation block B5 for applying a change of reference frame, from the a,b,c reference frame to the d,q reference frame. This block receives at the input the currents $i_a$, $i_b$, $i_c$ measured on the three phases of the electric motor and determines from the angle $\theta_s$, the current $i_d$ on the d-axis and the current $i_q$ on the q-axis.

Figure 2:
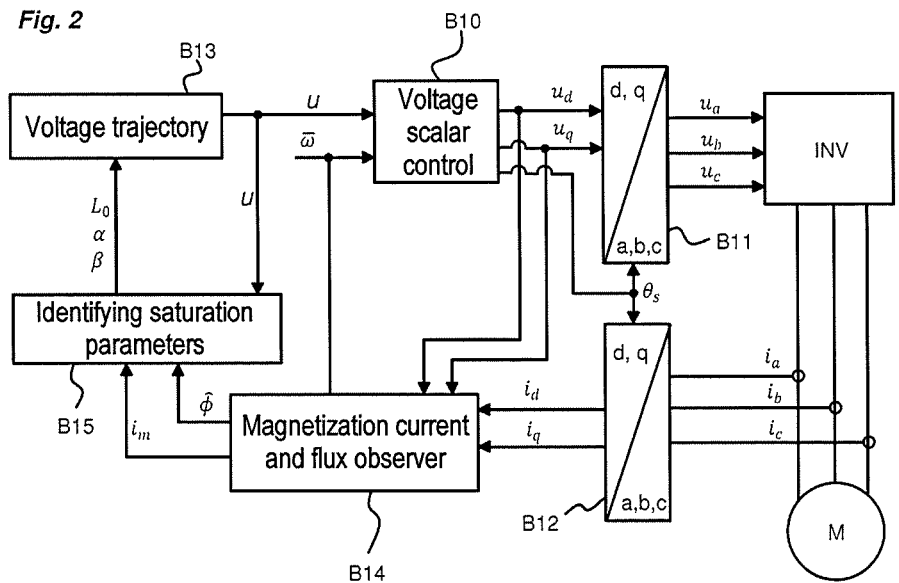
FIG. 2 illustrates, in the form of a diagram, the principle of the system of identifying of the invention, implemented within the framework of a scalar voltage control of the electric motor.

With reference to FIG. 2, in a scalar type control law, the reference speed $\overline{\omega}$ imposes a frequency on the inverter stage of the variable speed drive and consequently on the motor, which determines its rotation speed. The supply voltage of the motor is in direct relation to the frequency. Such a control law may comprise the following features:

A voltage scalar control block B10 that receives at the input a reference voltage u (in the form of a vector) and a speed reference $\overline{\omega}$ and determines the motor voltage $u_d$ on the d-axis and the motor voltage $u_q$ on the q-axis, and the angle $\theta_s$;

A first transformation block B11 for applying a change of reference frame, from the d,q reference frame to the a,b,c reference frame. This block receives at the input the motor voltage $u_d$ on the d-axis and the motor voltage $u_q$ on the q-axis and determines from the angle $\theta_s$, the voltages $u_a$, $u_b$, $u_c$ to be applied on the three phases of the electric motor;

A second transformation block B12 for applying a change of reference frame, from the a,b,c reference frame to the d,q reference frame. This block receives at the input the currents $i_a$, $i_b$, $i_c$ measured on the three phases of the electric motor and determines from the angle $\theta_s$, the current $i_d$ on the d-axis and the current $i_q$ on the q-axis.

The method of identifying of the invention is notably based on obtaining a variation of the magnetization flux in the electric motor.

Figure 4A:
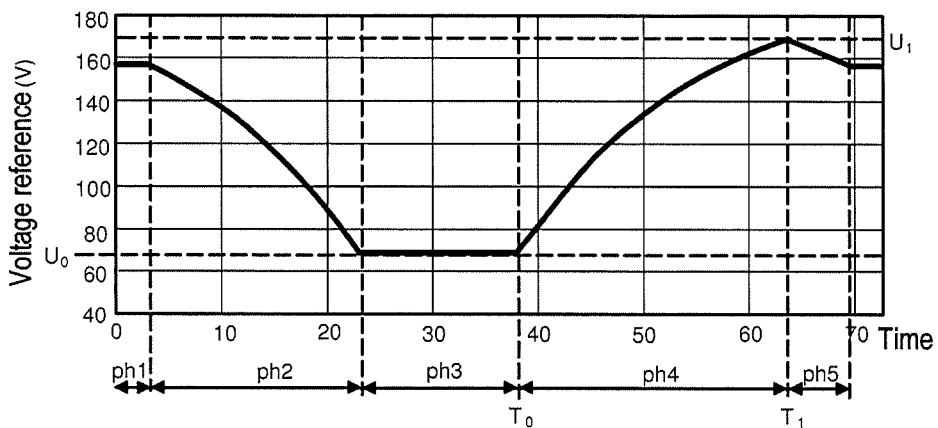
FIGS. 4A and 4B, respectively, represent an example of voltage trajectory and flux trajectory, applied in implementing the method of the invention.
Figure 4B:
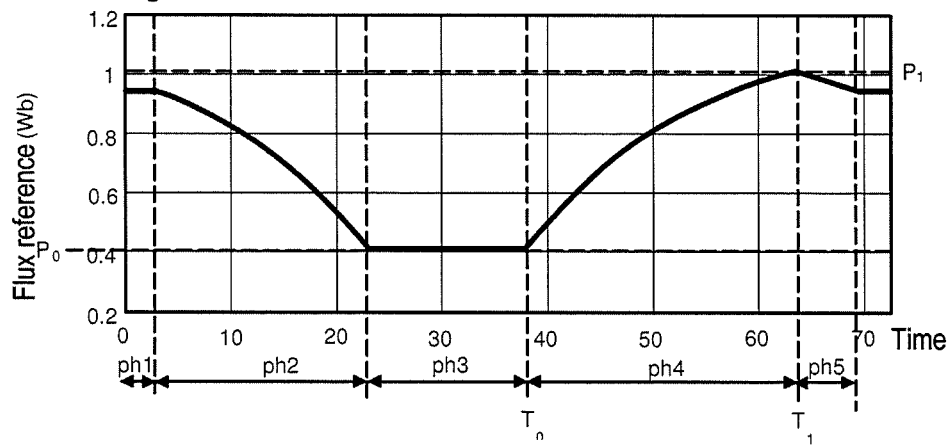

For a vector type flux control, this variation of magnetization flux is obtained by making the reference flux applied at the input of the control law follow a determined trajectory. By way of example, but not restrictively, FIG. 4B represents a trajectory followed by the reference flux within the framework of the invention. For this control, a flux trajectory block B6 is added at the input for determining the flux reference to be applied. The magnetization flux $\hat{\phi}$ is then estimated in the current control and flux observation block B2.

For a scalar type control, this variation of flow magnetization is obtained by making the reference voltage applied at the input of the control law follow a determined trajectory. The frequency applied at the input is kept constant. By way of example, but not restrictively, FIG. 4A represents a trajectory followed by the reference voltage within the framework of the invention. For this control, a voltage trajectory block B13 is added at the input for determining the voltage reference to be applied. The magnetization flux $\hat{\phi}$ is estimated in a magnetization current and magnetization flux observation block B14.

For both possible types of control law, the system of identifying also comprises a block B7, B15 for identifying the magnetic saturation parameters.

In the case of the vector type control law, the identifying block B7 receives at the input the magnetization current $i_d$ (corresponding to the current measured on the d-axis), the estimated flux $\hat{\phi}$, the current reference $\overline{i}_d$ on the d-axis and the flux reference $\overline{\phi}$.

In the case of the scalar type control law, the identifying block receives at the input the magnetization current, the estimated flux and the motor voltages on the d-axis and on the q-axis.

For both control modes (scalar or vector), the magnetic saturation parameters are identified in the manner described below.

It consists in implementing an observation and identification sequence comprising one or more iterations, each iteration being defined by a rank i, with i ranging from 1 to n.

An observation and identification sequence of rank i, when i is greater than or equal to 2, may include the following steps:

A step of applying a voltage reference or a flux reference at the input of the control law, according to a reference range, along the predefined trajectory, so as to obtain a variation of the magnetization flux. The trajectory creation block B6 or B13 is then executed.

A step of measuring the currents in the three phases of the motor and of determining the current on the d-axis (magnetization current).

A step of estimating the magnetization flux. The block B2 or B14 is then executed.

A step of constructing the actual profile expressing over the course of time the variation of the estimated magnetization flux according to the determined magnetization current. The block B7 or B15 is then executed.

A step of identifying the magnetic saturation parameters for the iteration in progress based on said actual profile constructed. The block B7 or B15 is executed.

A step of determining a deviation between the actual profile constructed and a theoretical profile obtained by taking into account the magnetic saturation parameters determined during the preceding iteration i−1. For the iteration in progress, the magnetic saturation parameters are not yet determined. The block B7 or B15 is executed.

If this deviation is less than a predefined threshold a decision step will then be executed.

If this deviation is greater than said predefined threshold, two cases are possible:
  If the deviation determined in this iteration i is less than the deviation obtained during the preceding iteration i−1, the magnetic saturation settings are updated with the parameters obtained for the iteration in progress. A new iteration i+1 is then launched.
  If the deviation determined during this iteration i is greater than the deviation obtained during the preceding iteration i−1, the magnetic saturation parameters are reinitialized with those obtained during the iteration i−2. A new iteration i+1 is then launched.

A first step may consist in initializing the magnetic saturation parameters with the parameters of a linear magnetic saturation model. In general, these parameters are applied by default in the absence of a more precise method of identifying parameters.

For simplifying the principle of the method of identifying, for the iteration of rank 1, a first observation and identification sequence may initially be implemented for obtaining a first set of parameters (different from the linear parameters defined above). The reference range used in the flux or voltage trajectory during this first sequence makes it possible to obtain a magnetic saturation curve located around the nominal flux.

The decision step consists in ensuring that the reference range applied at the input is sufficient. The same determined set of magnetic saturation parameters must be able to apply over a relatively extended portion of the magnetic saturation curve.

The successive iterations make it possible to extend the reference range as long as a set of magnetic saturation parameters remains valid for characterizing the magnetic saturation curve.

Thus, during the decision step, two cases may arise:
  If the reference range is not sufficient, a new iteration is launched with a new reference range wider than that of the iteration that has just finished. It will therefore be necessary to extend the voltage or flux reference range applied at the input for scanning a wider area of the magnetic saturation curve.

If the reference range is sufficient, an optional validation sequence may be performed.

This optional validation sequence consists in making sure that the magnetic saturation parameters present in memory at the end of the last iteration performed do make it possible to obtain a theoretical magnetic saturation profile which exhibits a deviation less than said predefined threshold in relation to the actual magnetic saturation profile.

Figure 3:
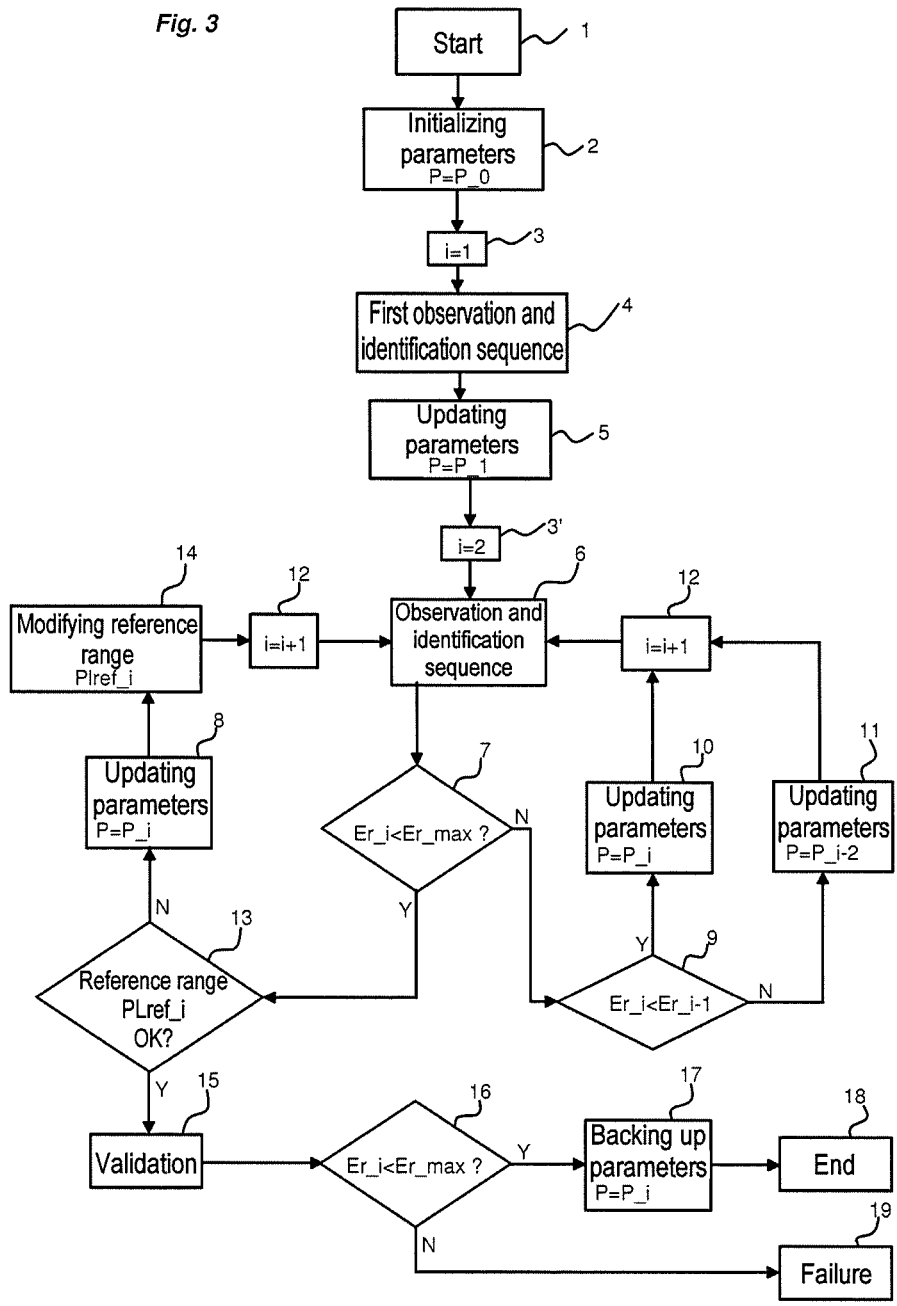
FIG. 3 represents a diagram illustrating the sequence of the method of identifying the magnetic saturation parameters.

FIG. 3 is a schematic representation of an algorithm that may be followed for implementing the identification of the magnetic saturation parameters. Thus, on the diagram there is:

A start block 1 marking the start of the identification process.

An initialization block 2 for initializing the magnetic saturation parameters, designated as P. The parameters are, for example, initialized to the value P_0 corresponding to the linear magnetic saturation parameters.

An assignment block 3 for assigning the rank 1 to the iteration rank i.

A start-up block 4 of a first observation and identification sequence. The object of this first sequence is to update the magnetic saturation parameters by applying a first reference range for obtaining a magnetization flux close to the nominal flux.

An updating block 5 for updating the magnetic saturation parameters with the parameters obtained at the end of the first observation and identification sequence. The parameters are, for example, updated to the value P_1.

An assignment block 3' for assigning the rank 2 to the iteration rank i, implemented before starting an observation and identification sequence.

A start-up block 6 of an observation and identification sequence. This sequence starts up by applying a flux or voltage trajectory over a reference range PLref_i. At the end of this sequence, the identifying block (B7 or B15) has:
  an actual magnetic saturation profile from the collected data (magnetization current and estimated flux);
  the theoretical profile based on the magnetic saturation parameters determined during the preceding iteration (P=P_1 initially);
  the deviation (designated $E_{r\_i}$ for the iteration i) between the actual profile and the theoretical profile.

A comparison block 7 for comparing between the determined deviation and the predefined threshold (designated $E_{rmax}$).

A comparison block 9 for comparing between the deviation $E_{r\_i}$ obtained for the iteration i and the deviation $E_{r\_i-1}$ obtained during the preceding iteration if $E_{r\_i} > E_{rmax}$ (branch N).

An updating block 10 for updating the magnetic saturation parameters P with the magnetic saturation parameters P_i identified during the iteration i if $E_{r\_i} < E_{r\_i-1}$ (branch Y).

An updating block 11 for updating the magnetic saturation parameters P with the magnetic saturation parameters P_i−2 identified during the iteration i−2 if $E_{r\_i} > E_{r\_i-1}$ (branch N).

Two incrementation blocks 12 for incrementing the iteration i, i=i+1, before restarting a new observation and identification sequence (block 6).

A verification block 13 for verifying the reference range used during the observation and identification sequence. This block helps to make sure that the reference range used is sufficiently wide and that it will make it possible to cover a sufficiently wide portion of the magnetic saturation curve.

An updating block 8 for updating the magnetic saturation parameters P with the magnetic saturation parameters P_i determined during this iteration i, this block being executed if $E_{r\_i} < E_{rmax}$ (branch Y) and if the reference range PLref_i is not sufficient (less than a threshold range PL_th).

A reference range modifying block 14 if the reference range used during the observation and identification sequence is not wide enough (branch N—range PLref_i less than PL_th). After a redefinition of the reference range, a new observation and identification sequence can start.

A validation block 15 for validating whether the reference range PLref_i applied proves sufficiently wide (branch Y–range PLref_i greater than PL_th).

During the validation, a verification block 16 for verifying the deviation $E_{r\_i}$ determined in relation to $E_{rmax}$.

A back-up block 17 for backing up the magnetic saturation parameters identified during the iteration of rank i if $E_{r\_i} < E_{rmax}$ (branch Y).

An end block 18 following the back-up block 17.

An identification failure block 19 if $E_{r\_i} > E_{rmax}$ (branch N). It will then be necessary to retain, for example, the linear magnetic saturation parameters.

In a more detailed way, within the framework of a flux vector control law, the method offers the particular features described below.

With reference to FIG. 1, identifying the magnetic saturation parameters is implemented in the specific identifying block B7 incorporated in the control law.

It relies notably on an estimate of the magnetization flux performed by the flux observer block B2.

The speed of the motor is estimated from the measured currents (speed observer block B3). The current (current control and flux observer block B2) and the speed (speed control block B1) are controlled by using PI (proportional-integral) action controllers.

During the identification of the magnetic saturation parameters, the motor (under no-load or under load) is controlled at a constant speed by the vector control law. It may notably be considered that the motor turns at half its nominal speed (for avoiding voltage limitation).

In the course of each iteration, the block B6 causes the flux reference $\bar{\phi}$ to follow a trajectory between $P_0$ and $P_1$ (see FIG. 4B). An example of the trajectory of the flux during the first step of applying the trajectory is illustrated in FIG. 4B.

This trajectory is, for example, the following:
First phase ph1 of preparation at constant flux;
Second phase ph2 of reducing the flux in a ramp to bring it down to a minimum value $P_0$.
Third phase ph3 of stabilizing at the minimum value $P_0$.
Fourth phase ph4 of increasing the flux from the minimum value $P_0$ at instant $T_0$ until reaching the maximum value $P_1$ at instant $T_1$. The step of identifying the magnetic saturation parameters starts at instant $T_0$ and ends at instant $T_1$. The object is then to scan the whole area of the magnetic saturation curve located between $P_0$ and $P_1$. The block B7 for identifying the magnetic saturation parameters then implements, between $T_0$ and $T_1$, a recursive non-linear least square type resolution algorithm which makes it possible to estimate the saturation parameters.
A fifth phase ph5 of reducing the flux.

It should be noted that, in the case of a scalar type control, the same phases ph1 to ph5 apply in the case of applying a voltage trajectory, between a minimum value $U_0$ and a maximum value $U_1$, as represented in FIG. 4A. In this case, the object is also to scan the whole magnetic saturation curve.

A modification of the reference range PLref_i will therefore consist in modifying the minimum and/or the maximum flux or voltage value, notably for extending this reference range.

A step of comparing the applied reference range PLref_i with a minimum threshold PL_th will be, for example, implemented for deciding whether or not the applied reference range is sufficient in the course of each iteration.

The control law makes it possible to estimate the flux in the flux observer block B2. Estimating the flux is a prerequisite for the magnetic saturation identification algorithm. There are multiple methods for estimating the flux. By way of example and without loss of generality, at medium and high speed (in this case), the flux may be approximated by using the following relationship:

$$\hat{\phi} = \frac{u_s}{|\omega_s|}.$$

With:

$$u_s = \sqrt{\frac{2}{3}(u_a^2 + u_b^2 + u_c^2)}$$

which is the amplitude of the motor voltage where $u_a$, $u_b$ and $u_c$ are the voltages applied by the variable speed drive to the motor.

$\omega_s$ (rd/s) is the electrical pulsation of the voltages applied by the variable speed drive to the motor.

The magnetic saturation model used is represented by a mathematical relationship between the magnetization current $i_d$ and the magnetization flux $\phi$:

$$i_d = f(\phi) = \frac{\phi}{L_0} \times \frac{1 - \alpha\phi}{1 - \beta\phi^2}$$

where $L_0$, $\alpha$ and $\beta$ are the magnetic saturation parameters and $f$ is the magnetic saturation function.

At each iteration, it is from such a magnetic saturation model that the magnetic saturation parameters are determined. The set of magnetic saturation parameters will make it possible to obtain the theoretical profile that best approximates the actual profile.

The current measurement $i_d$ and the estimated flux $\hat{\phi}$ are used in real time by the block B7 for identifying the magnetic saturation parameters for estimating the saturation parameters by using the recursive non-linear least square type resolution algorithm. The object is then to find the parameters of the saturation function $f$ (described in the model) which best approximate the "estimated magnetization flux-magnetization current" relationship which is obtained experimentally:

$$i_d = f(\hat{\phi})$$

At the end of each identifying step, the algorithm determines the values of the saturation parameters $L_0$, $\alpha$ and $\beta$ which are based on the data (flux and current) obtained during the iteration in progress. These parameters will be used in the next iteration.

In this embodiment, the acceptance deviation between the actual profile determined for the iteration in progress and the theoretical profile obtained from the magnetic saturation parameters obtained during the preceding iteration, is based on the following quantity Er:

$$E_r = \frac{100}{T_1 - T_0} \int_{T_0}^{T_1} \left[ \frac{\Delta \phi(t)}{\phi_n} + \frac{\Delta i_d(t)}{I_n} \right] dt$$

where:
$\Delta\phi(t) = |\hat{\phi}(t) - \bar{\phi}(t)|$, $\Delta i(t) = |i_d(t) - \bar{i}(t)|$,
$\phi_n$ is the nominal flux of the motor,
$I_n$ is the nominal current of the motor,
$T_0$ is the time of the start of identifying and $T_1$ is the time of the end of identifying (see FIG. 4A).

In other words, the quantity $E_r$ represents the "distance" or the deviation between the actual saturation profile obtained during the iteration in progress and the theoretical profile obtained with the saturation parameters determined during the preceding iteration.

The quantity $E_r$ is determined on line in real-time by integrating $\Delta\phi(t)$ and $\Delta i(t)$. During each iteration, a value of $E_r$ is obtained which corresponds to the magnetic saturation parameters obtained in the preceding step. It is only at the end of each iteration that a new value of $E_r$ is obtained.

At each iteration, the acceptance criterion of the magnetic saturation parameters is:

$$E_r < E_{rmax}$$

where $E_{rmax}$ is a predefined threshold (set at 2%, for example). This threshold is stored in memory.

Figure 5:
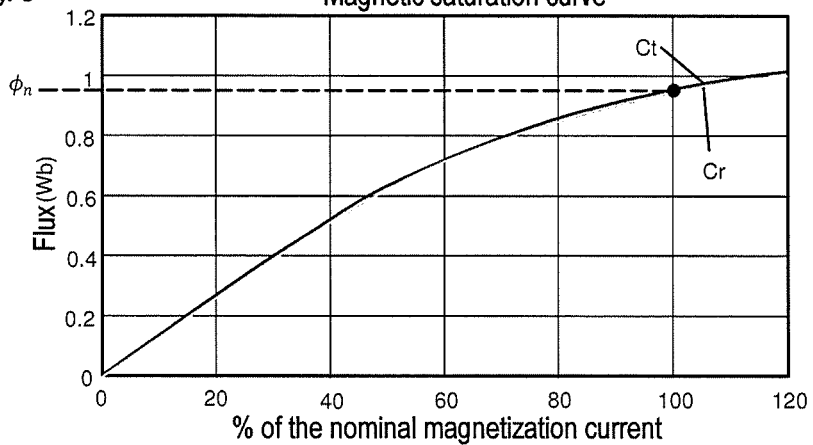
FIG. 5 represents the actual curve and the theoretical curve of magnetic saturation (current/flux) obtained in implementing the invention.

FIG. 5 shows the actual (curve Cr) and theoretical (curve Ct) magnetic saturation profiles obtained during an iteration. This curve clearly shows the non-linearity of the flux when moving away from the nominal operating point (defined by the point at the nominal flux $\phi_n$). The magnetization inductances (estimated L and theoretical L) are calculated as follows:

$$\hat{L} = \frac{\hat{\phi}}{i_d} \text{ and } L = \frac{\bar{\phi}}{\bar{i}_d}.$$

It should be understood that the same particular features and the same principles apply in the case of a scalar type control law.

In the case of a scalar type control, identifying the magnetic saturation parameters is based on the magnetization current (Im) which does not directly correspond to the current measured on the d-axis.

Described below are two examples of the use of the magnetic saturation curve (high speed, energy saving), showing the utility of identifying the magnetic saturation parameters for a wide range of operation.

Figure 6:
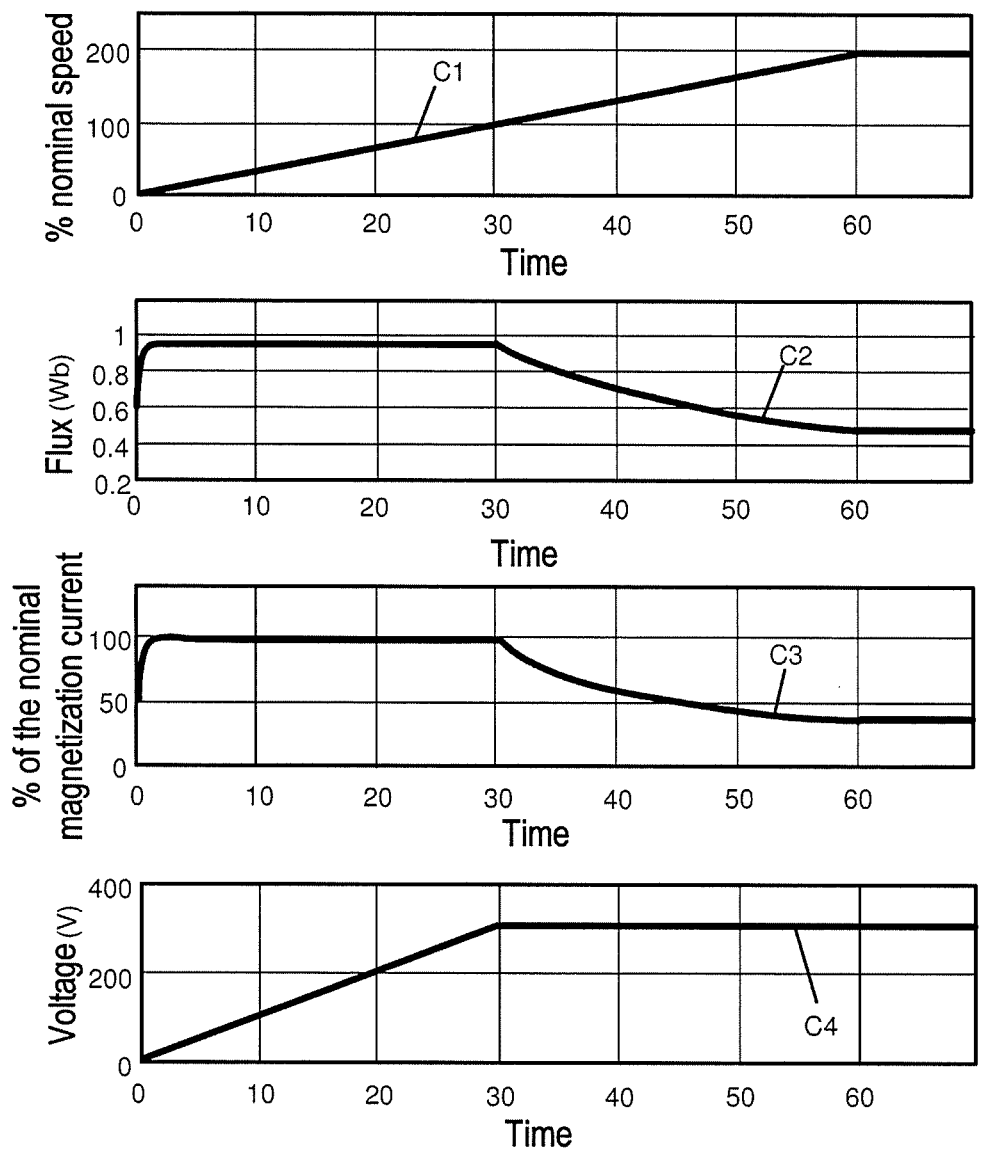
FIGS. 6 and 7 illustrate the utility of the invention in the case of a particular mode of operation of the asynchronous electric motor.
Figure 7:
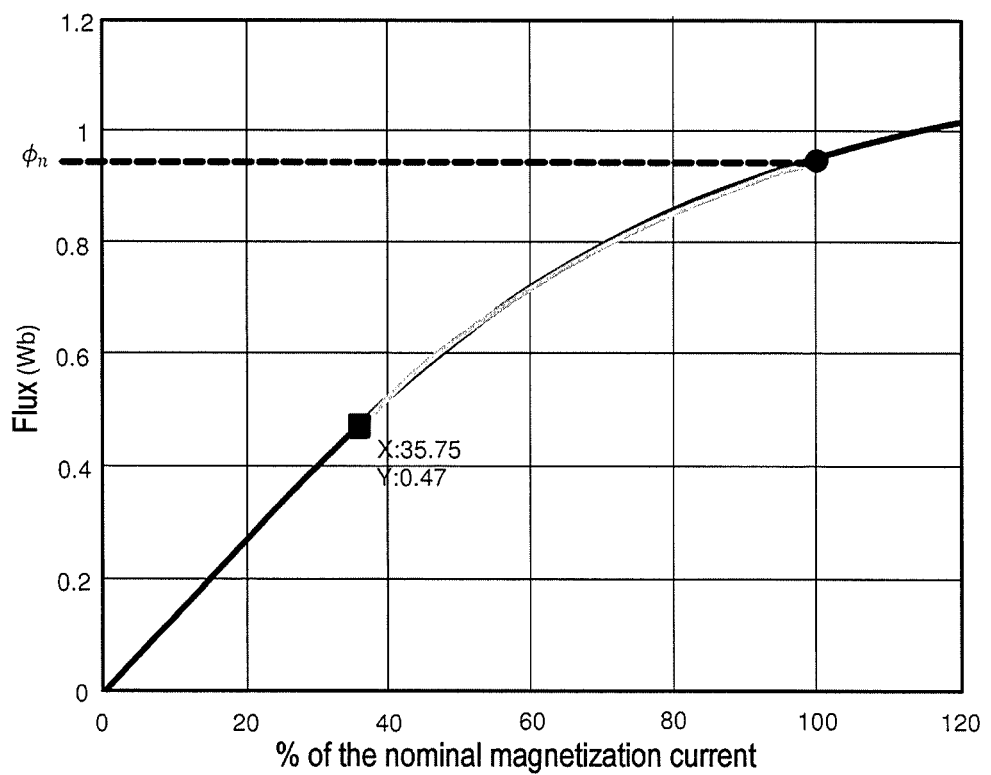

High Speed Operation:

FIG. 6 and FIG. 7 show a case of operating a motor at high speed. The speed varies between 0 and 2 times the nominal speed of the motor (first curve C1). These figures show a variation of the flux (curves C2 and C3) in a far field of the nominal flow which demonstrates the utility of considering the non-linear effects of magnetic saturation for effectively controlling the motor. Indeed, when the speed exceeds the nominal speed, the motor is in voltage limitation (curve C4) and to increase the speed the flux must be lowered (which is termed defluxing—"Field Weakening").

FIG. 7 thus shows that the magnetization current falls to 35.75% of its nominal value at high speed.

Figure 8:
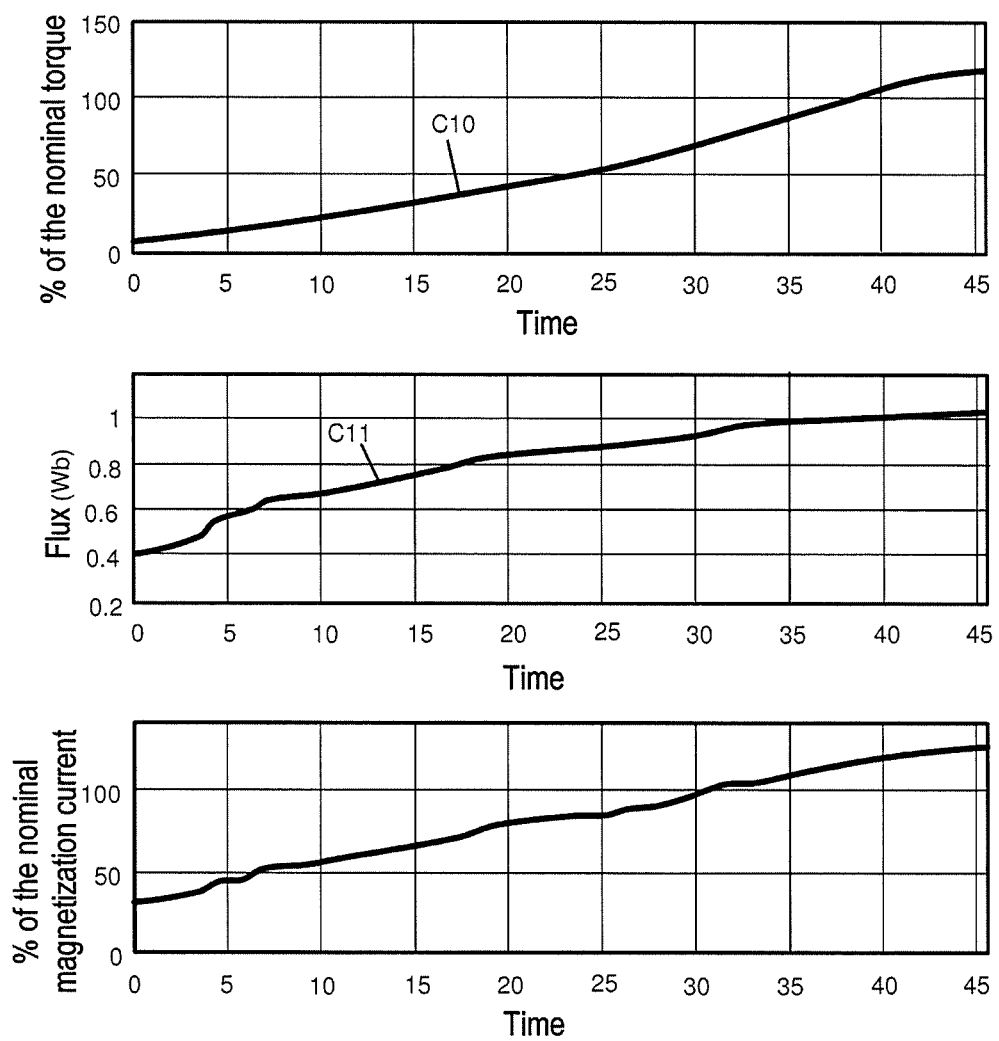
FIGS. 8 and 9 illustrate the utility of the invention in the case of another particular mode of operation of the asynchronous electric motor.
Figure 9:
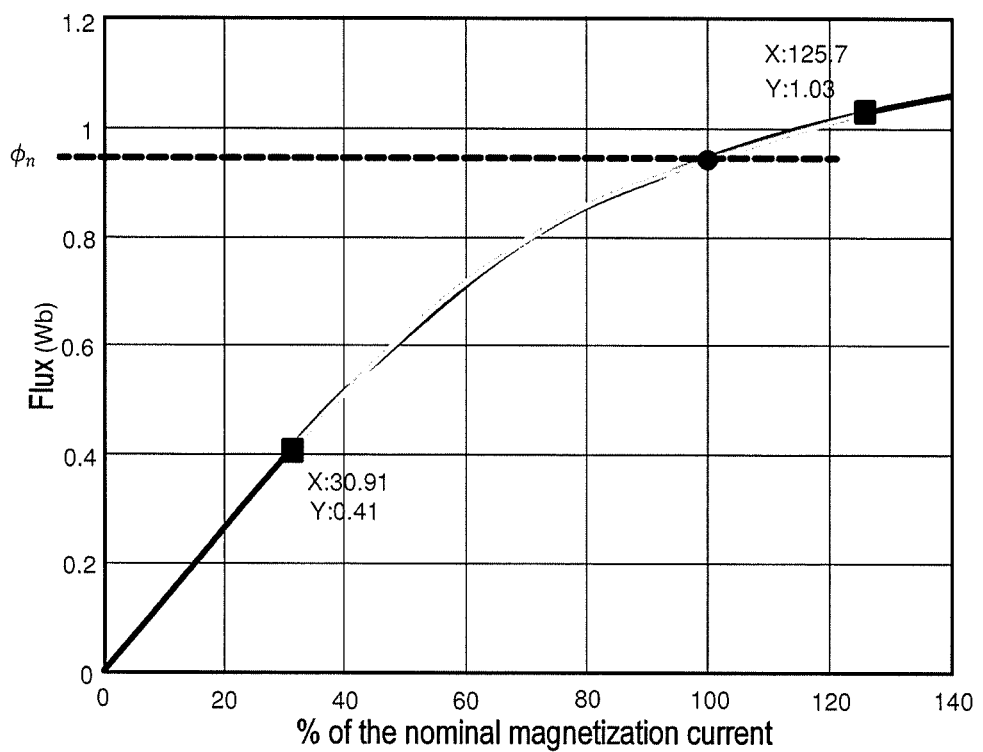

Operation in Energy-saving Mode:

FIG. 8 and FIG. 9 show operation in energy-saving mode with the torque varying between 5% and 120% of the nominal torque (curve C10). These figures show that the flux varies in a wide area around the nominal flux (curve C11). In fact, when the electromagnetic torque is low, the flux is lowered for reducing the current in the motor thus lowering its energy consumption. On the other hand, when the torque of the engine is very high, the flux is increased to lower the torque current and thus optimize the energy consumed by the motor. Finally, during this operating mode, the flux undergoes sharp variations according to the level of the torque.

FIG. 9 shows the portion of the magnetic saturation curve traversed during operation in energy-saving mode. This figure shows that the magnetization current varies between 30.91% and 125.7% of its nominal value.

This curve may be used in normal operation of the motor to compensate for the effects of magnetic saturation. This makes it possible to improve the motor control performance: reduction in energy consumption and in total current consumed for the same operating point (torque, speed) and maximization of the torque achievable for a given maximum current.

It is clear from the foregoing that part of the ingenuity of the invention consists in validating the magnetic saturation parameters determined during the iteration in progress by taking into account the actual magnetic saturation profile that they are supposed to best approximate. It would be possible to wait until the end of identifying the magnetic saturation parameters for the iteration in progress, then to construct the theoretical profile from these parameters and compare it to the actual profile for comparison. But this solution is not effective. In the solution of the invention, the comparison of the actual profile and the theoretical profile, obtained from the magnetic saturation parameters of the preceding iteration, may be performed in parallel with identifying the magnetic saturation parameters for the iteration in progress. The duration of processing is therefore optimized.

It emerges from this that the invention which consists in determining the magnetic saturation parameters that best approximate the magnetic saturation curve of the motor, over a sufficiently wide range, offers many advantages, including:

Improving the stability and performance of the electric motor running at very high speed;
Improving the maximum torque supplied by the electric motor;
Reducing the current consumption by the electric motor;
Increasing the energy efficiency of the electric motor.

The invention claimed is:

1. A method of identifying the magnetic saturation parameters of an asynchronous electric motor (M), the method comprising implementing a sequence comprising one or more iterations, each iteration being defined with a rank i, with i ranging from 1 to n, each iteration of rank i when i is greater than or equal to 2 comprising the following steps:
   a) applying a trajectory to a reference voltage or to a reference flux, over a reference range (PLref_i) having a voltage or flux amplitude between a minimum value and a maximum value, b) acquiring the values of the currents ($i_a$, $i_b$ and $i_c$) in the phases of the electric motor and determining the corresponding magnetization current, c) estimating the magnetization flux p($\hat{\phi}$), d) constructing an actual profile for the iteration of rank i comprising said estimated magnetization flux according to the measured magnetization current, e) determining the magnetic saturation parameters corresponding to the actual profile of the iteration of rank i, f) determining a deviation ($E_{r\_i}$) between said actual profile for the iteration of rank i and a theoretical profile constructed from the magnetic saturation parameters obtained during the iteration of rank i−1, and g) validating the magnetic saturation parameters obtained during the iteration of rank i when said deviation is less than a threshold ($E_{rmax}$) and when the reference range (PLref_i) applied at the input has a sufficient amplitude.

2. The method according to claim 1, wherein when said deviation ($E_{r\_i}$) is greater than said threshold ($E_{rmax}$), the method further comprises the following step:

comparing said deviation ($E_{r\_i}$) of the iteration of rank i in relation to the deviation ($E_{r_{i-1}}$) obtained during the iteration of rank i−1, i. when said deviation of the iteration of rank i is less than the deviation obtained for the iteration of rank i−1, storing the magnetic saturation parameters obtained for the iteration of rank i and implementing the iteration of rank i+1 with a new reference range, and ii. when said deviation of the iteration of rank i is greater than the deviation obtained for the iteration of rank i−1, storing the magnetic saturation parameters obtained during the iteration of rank i−2 and implementing the iteration of rank i+1 with a new reference range.

3. The method according to claim 1, further comprising, after step f), a step of verifying the reference range used in relation to a threshold range (PL_th).

4. The method according to claim 3, further comprising, after said step of verifying, a step of updating the magnetic saturation parameters with the magnetic saturation parameters calculated during the iteration of rank i when the applied reference range is less than said threshold range (PL_th).

5. The method according to claim 4, further comprising a step of modifying said reference range after said step of updating the magnetic saturation parameters and implementing the iteration of rank i+1 with a new reference range.

6. The method according to claim 1, wherein for the iteration of rank i=1, the magnetic saturation parameters are determined so that the estimated magnetization flux ($\hat{\phi}$) is substantially equal to the nominal flux.

7. A system of identifying the magnetic saturation parameters of an asynchronous electric motor (M), the system being configured to implement a sequence comprising one or more iterations, each iteration being defined with a rank i, with i ranging from 1 to n, and for each iteration of rank i when i is greater than or equal to 2 the system comprises:

a) a module for applying a trajectory to a reference voltage or to a reference flux, over a reference range, b) a module for acquiring the currents ($i_a$, $i_b$ and $i_c$) in the phases of the electric motor and determining the corresponding magnetization current, c) a module for estimating the magnetization flux ($\hat{\phi}$), d) a module for constructing an actual profile for the iteration of rank i comprising said estimated magnetization flux according to the measured magnetization current, e) a module for determining the magnetic saturation parameters corresponding to the actual profile of the iteration of rank i, f) a module for determining a deviation ($E_{r\_i}$) between said actual profile for the iteration of rank i and a theoretical profile constructed from the magnetic saturation parameters obtained during the iteration of rank i−1, and g) a module for validating the magnetic saturation parameters obtained during the iteration of rank i when said deviation is less than a threshold ($E_{rmax}$) and when the reference range (PLref_i) applied at the input has a sufficient amplitude.

8. The system according to claim 7, wherein when said deviation ($E_{r\_i}$) is greater than said threshold ($E_{rmax}$), said system comprises a module for comparing said deviation ($E_{r\_i}$) of the iteration of rank i in relation to the deviation ($E_{r_{i-1}}$) obtained during the iteration of rank i−1, and:

i. when said deviation of the iteration of rank i is less than the deviation obtained for the iteration of rank i−1, said system is set up for executing a module for storing the magnetic saturation parameters obtained for the iteration of rank i and implementing the iteration of rank i+1 with a new reference range, and ii. when said deviation of the iteration of rank i is greater than the deviation obtained for the iteration of rank i−1, said system is set up for executing a module for storing the magnetic saturation parameters obtained during the iteration of rank i−2 and implementing the phase of rank i+1 with a new reference range.

9. The system according to claim 7, further comprising a module for verifying the reference range used in relation to a threshold range (PL_th), executed when said deviation is less than a threshold ($E_{rmax}$).

10. The system according to claim 9, further comprising a module for updating the magnetic saturation parameters with the magnetic saturation parameters calculated during the iteration of rank i when the applied reference range is less than said threshold range (PL_th).

11. The system according to claim 10, further comprising a module for modifying said reference range after said step of updating the magnetic saturation parameters and implementing the iteration of rank i+1 with a new reference range.

12. The system according to claim 7, wherein for the iteration of rank i=1, the magnetic saturation parameters are determined so that the estimated magnetization flux ($\hat{\phi}$) is substantially equal to the nominal flux.

13. A variable speed drive, comprising the system of identifying as defined in claim 7.

* * * * *